United States Patent
Wilkerson et al.

(10) Patent No.: US 9,417,879 B2
(45) Date of Patent: Aug. 16, 2016

(54) SYSTEMS AND METHODS FOR MANAGING RECONFIGURABLE PROCESSOR CORES

(71) Applicant: Intel Corporation, Santa Clara, CA (US)

(72) Inventors: Christopher B. Wilkerson, Portland, OR (US); Alaa R. Alameldeen, Hillsboro, OR (US); Eugene Gorbatov, Hillsboro, OR (US); Zeshan A. Chishti, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 244 days.

(21) Appl. No.: 13/924,334

(22) Filed: Jun. 21, 2013

(65) Prior Publication Data

US 2014/0380019 A1 Dec. 25, 2014

(51) Int. Cl.
*G06F 9/38* (2006.01)
*G06F 9/50* (2006.01)

(52) U.S. Cl.
CPC ............ *G06F 9/3836* (2013.01); *G06F 9/5077* (2013.01); *G06F 2209/507* (2013.01); *Y02B 60/142* (2013.01); *Y02B 60/167* (2013.01)

(58) Field of Classification Search
None
See application file for complete search history.

(56) References Cited

U.S. PATENT DOCUMENTS

| | | | | |
|---|---|---|---|---|
| 8,180,997 B2 * | 5/2012 | Burger et al. | | 712/15 |
| 2005/0154851 A1 * | 7/2005 | Charles | | G06F 12/023 711/170 |
| 2007/0294689 A1 * | 12/2007 | Garney | | 718/1 |
| 2008/0109637 A1 * | 5/2008 | Martinez et al. | | 712/29 |
| 2010/0153700 A1 * | 6/2010 | Capps et al. | | 713/100 |

OTHER PUBLICATIONS

Yasuko Watanabe et al.; WiDGET: Wisconsin Decoupled Grid Execution Tiles; International Symposium on Computer Architecture (ISCA), Jun. 19-23, 2010, 12 pages.
Khubaib et al.; MorphCore: An Energy-Efficient Microarchitecture for High Performance ILP and High Throughout TLP; 12 pages.
Engin Ipek et al.; Core Fusion: Accommodating Software Diversity in Chip Multiprocessors, International Symposium on Computer Architecture (ISCA), Jun. 9-13, 2007, 12 pages.

* cited by examiner

*Primary Examiner* — Lewis A Bullock, Jr.
*Assistant Examiner* — Bruce S Ashley
(74) *Attorney, Agent, or Firm* — Lowenstein Sandler LLP

(57) ABSTRACT

Systems and methods for managing reconfigurable processor cores. An example processing system comprises a plurality of processor cores; a control register including a plurality of state bits, each state bit indicating a state of a corresponding processor core, the control register further including a plurality of inhibit bits, each inhibit bit indicating whether a corresponding processor core is allowed to merge with other processor cores; and a core management logic configured to merge a first processor core and a second processor core, responsive to determining that a first state bit corresponding to the first processor core is set, a first inhibit bit corresponding to the first processor core is cleared, a second state bit corresponding to the second processor core is cleared, and a second inhibit bit corresponding to the second processor core is cleared.

19 Claims, 11 Drawing Sheets

SYSTEMS AND METHODS FOR MANAGING RECONFIGURABLE PROCESSOR CORES

TECHNICAL FIELD

The present disclosure is generally related to processing systems, and is specifically related to systems and method for managing reconfigurable processor cores.

BACKGROUND

Traditional processor core microarchitectures do not adapt well to the thread level parallelism available in programs. While large out-of-order (OOO) cores are capable of providing high single thread performance by exploiting instruction-level parallelism, they may become power-inefficient for multi-threaded programs. Conversely, small cores provide high parallel throughput, but may do so at the cost of poor single thread performance.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
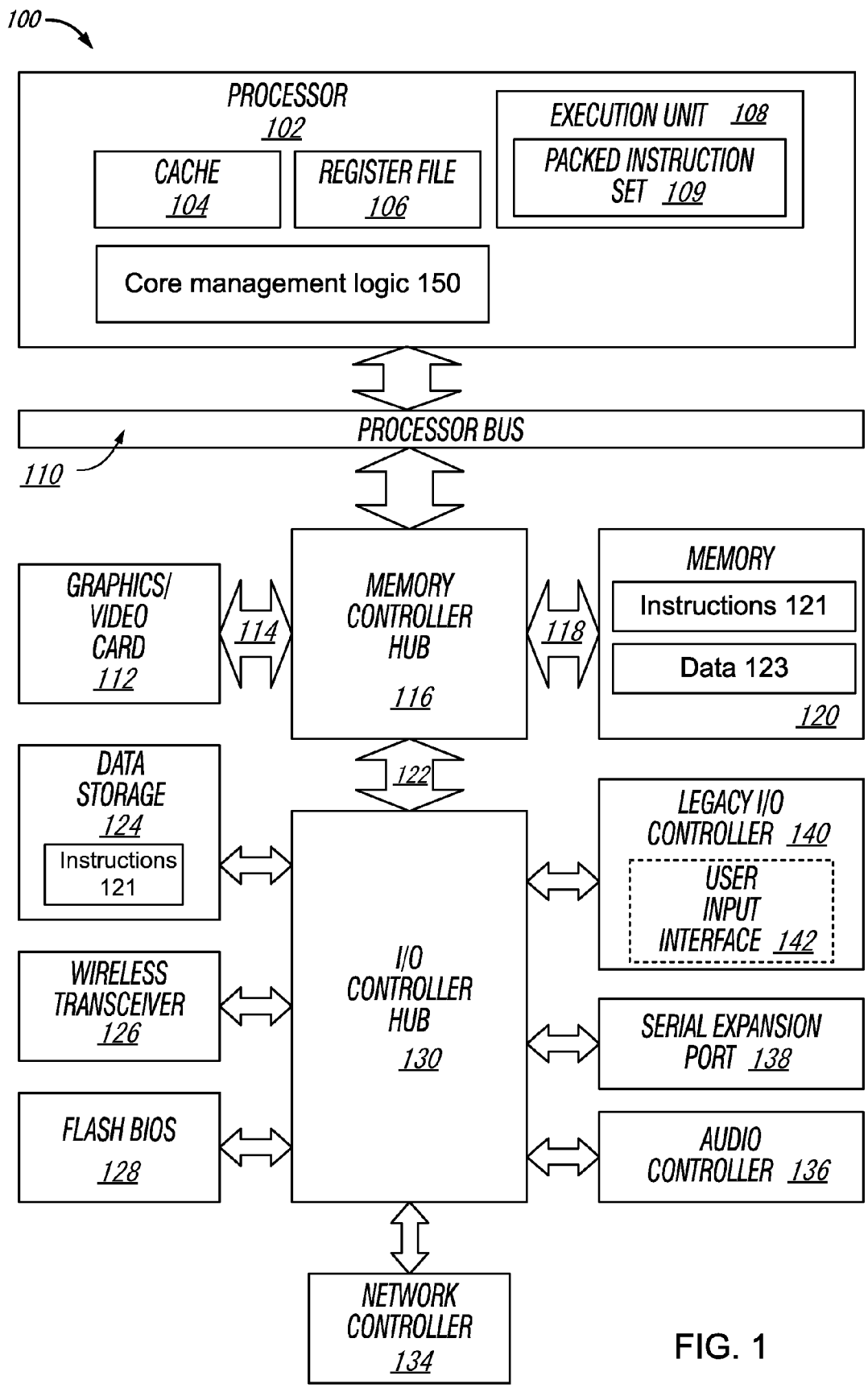
FIG. 1 depicts a high-level component diagram of an example computer system, in accordance with one or more aspects of the present disclosure.

Described herein are computer systems, and related methods for managing reconfigurable processor cores. "Core" herein shall refer to an execution resource for executing a single thread. According to this definition, a two-way multi-threading core should be referred to as two cores.

In many processor architectures, the number of cores, and, hence, the maximum number of simultaneously running threads, is constant. For example, an operating system running on a 16-core processor may schedule up to 16 simultaneous threads. In certain implementations, a processor may comprise out-of-order (OOO) cores designed to improve the performance by executing instructions as soon as their operands become available, rather than in the program order. However, the performance benefit may be offset by a considerable increase in the power consumption. When multiple execution threads are available for the operating system to schedule, employing multiple in-order cores rather than large OOO cores may improve the energy consumption profile of the processor without compromising the overall performance.

Thus, to improve the performance and energy consumption scalability of a processor, the latter may be designed to support a variable number of cores depending on the performance needs and the number of threads available to the operating system for scheduling. A processor may further provide an interface for the operating system to manage the reconfigurable cores depending on the number and performance needs of active threads.

A processor comprising two or more processor cores may be capable of dynamically reconfiguring itself by "fusing" two or more cores into one core having a larger fetch, issue, and commit width, a larger cache size and/or a larger branch predictor size. An example processor may be configured to support various degrees of parallelism in the software being executed, ranging from supporting highly parallel software by providing multiple processing cores to supporting sequentially executable code by merging two or more processing cores into a more powerful processing core.

An example processor may further comprise a core state memory designed to store the state of a processor core transitioning into the inactive state, thus allowing to re-allocate the core's resources to another core when the processor reconfigures. The core state may be restored from the core state memory responsive to the core's re-partitioning and transitioning into the active state. Various aspects of the above referenced methods and systems are described in details herein below by way of examples, rather than by way of limitation.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation in order to provide a thorough understanding of the present disclosure. It will be apparent, however, to one skilled in the art that these specific details need not be employed to practice the methods disclosed herein. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

Although the following embodiments are described with reference to a processor, other embodiments are applicable to other types of integrated circuits and logic devices. Similar techniques and teachings of embodiments described herein can be applied to other types of circuits or semiconductor devices that can benefit from higher pipeline throughput and improved performance. The teachings of embodiments described herein are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments described herein rather than to provide an exhaustive list of all possible implementations of embodiments described herein.

Although the below examples describe instruction handling and distribution in the context of execution units and logic circuits, other embodiments of the systems and methods described herein can be accomplished by way of a data or instructions stored on a machine-readable, tangible medium, which when performed by a machine cause the machine to perform functions consistent with at least one embodiment described herein. In one embodiment, functions associated with embodiments described herein are embodied in machine-executable instructions. The instructions can be used to cause a general-purpose or special-purpose processor that is programmed with the instructions to perform the methods described herein. Embodiments described herein may be provided as a computer program product or software which may include a machine or computer-readable medium having stored thereon instructions which may be used to program a computer (or other electronic devices) to perform one or more operations according to embodiments described herein. Alternatively, operations of embodiments described herein might be performed by specific hardware components that contain fixed-function logic for performing the operations, or by any combination of programmed computer components and fixed-function hardware components.

Instructions used to program logic to perform the methods described herein can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

"Processor" herein shall refer to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may include one or more processor cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

FIG. 1 depicts a high-level component diagram of one example of a computer system in accordance with one or more aspects of the present disclosure. A computer system 100 may include a processor 102 to employ execution units including logic to perform algorithms for processing data, in accordance with the embodiment described herein. System 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments described herein are not limited to any specific combination of hardware circuitry and software.

Embodiments are not limited to computer systems. Alternative embodiments of the systems and methods described herein can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 102 includes one or more execution units 108 to implement an algorithm that is to perform at least one instruction. One embodiment may be described in the context of a single processor desktop or server system, but alternative embodiments may be included in a multiprocessor system. System 100 is an example of a 'hub' system architecture. The computer system 100 includes a processor 102 to process data signals. The processor 102, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that transmits data signals between the processor 102 and other components in the system 100. The elements of system 100 (e.g. graphics accelerator 112, memory controller hub 116, memory 120, I/O controller hub 124, wireless transceiver 126, Flash BIOS 128, Network controller 134, Audio controller 136, Serial expansion port 138, I/O controller 140, etc.) perform their conventional functions that are well known to those familiar with the art.

In one embodiment, the processor 102 includes a Level 1 (L1) internal cache 104. Depending on the architecture, the processor 102 may have a single internal cache or multiple levels of internal caches. Other embodiments include a combination of both internal and external caches depending on the particular implementation and needs. Register file 106 is to store different types of data in various registers including integer registers, floating point registers, vector registers, banked registers, shadow registers, checkpoint registers, status registers, and instruction pointer register.

Execution unit 108, including logic to perform integer and floating point operations, also resides in the processor 102. The processor 102, in one embodiment, includes a microcode (ucode) ROM to store microcode, which when executed, is to perform algorithms for certain macroinstructions or handle complex scenarios. Here, microcode is potentially updateable to handle logic bugs/fixes for processor 102. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time. Alternate embodiments of an execution unit 108 may also be used in micro controllers, embedded processors, graphics devices, DSPs, and other types of logic circuits. In certain implementations, the processor 102 may further include a core management logic 150, the functioning of which is described in details herein below.

System 100 includes a memory 120. Memory 120 includes a dynamic random access memory (DRAM) device, a static random access memory (SRAM) device, flash memory device, or other memory device. Memory 120 stores instructions 121 and/or data 123 represented by data signals that are to be executed by the processor 102. In certain implementations, instructions 121 may include instructions employing the core management logic 150 for managing reconfigurable processor cores, as described in more details herein below.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 2:
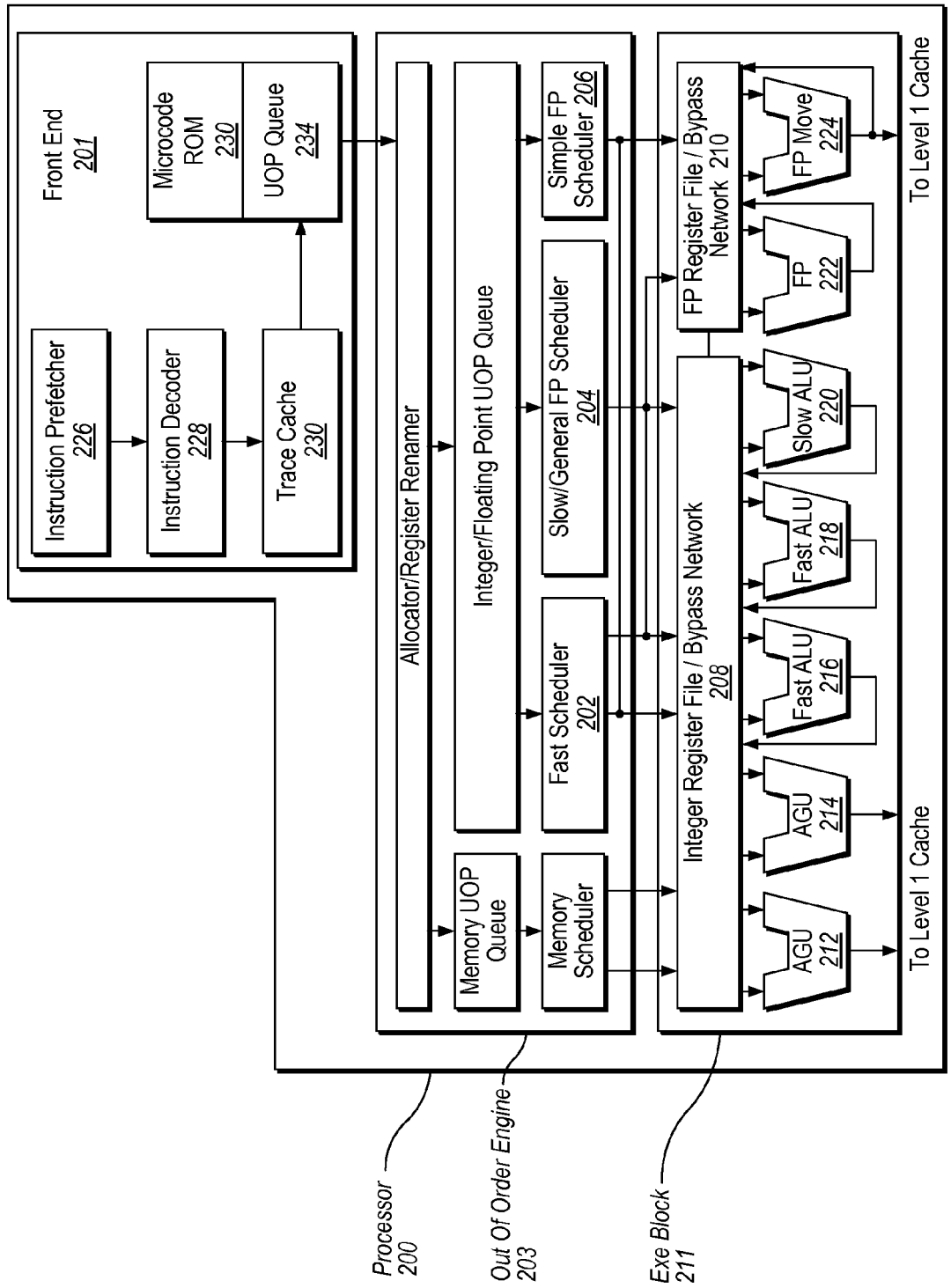
FIG. 2 depicts a block diagram of a processor, in accordance with one or more aspects of the present disclosure.

FIG. 2 is a block diagram of the micro-architecture for a processor 200 that includes logic circuits to perform instructions in accordance with one or more aspects of the present disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also referred to as uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete an instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to an entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register aliasing logic maps logical registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206 determine when a uop is ready to execute based on the readiness of their dependent input register operand sources and the availability of the execution resources the uops need to complete their operation. The fast scheduler 202 of one embodiment can schedule on each half of the main clock cycle while the other schedulers can schedule once per main processor clock cycle. The schedulers arbitrate for the dispatch ports to schedule uops for execution.

Physical register files 208, 210 sit between the schedulers 202, 204, 206, and the execution units 212, 214, 216, 218, 220, 222, 224 in the execution block 211. There is a separate register file 208, 210 for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX™, Single Instruction Multiple Data (SIMD), and Streaming SIMD Extention (SSE), or other operations. The floating point ALU 222 of one embodiment includes a 64 bit by 64 bit floating point divider to execute divide, square root, and remainder micro-ops. For systems and methods described herein, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220 are described in the context of performing integer operations on 64 bit data operands. In alternative embodiments, the ALUs 216, 218, 220 can be implemented to support a variety of data bits including 16, 32, 128, 256, etc. Similarly, the floating point units 222, 224 can be implemented to support a range of operands having bits of various widths. For one embodiment, the floating point units 222, 224 can operate on 128 bits wide packed data operands in conjunction with SIMD and multimedia instructions.

In one embodiment, the uops schedulers 202, 204, 206 dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register aliasing, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with the MMX™ technology from Intel Corporation of Santa Clara, Calif. These MMX™ registers, available in both integer and floating point forms, can operate with packed data elements that accompany SIMD and SSE instructions. Similarly, 128 bits wide XMM™ registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 3A:
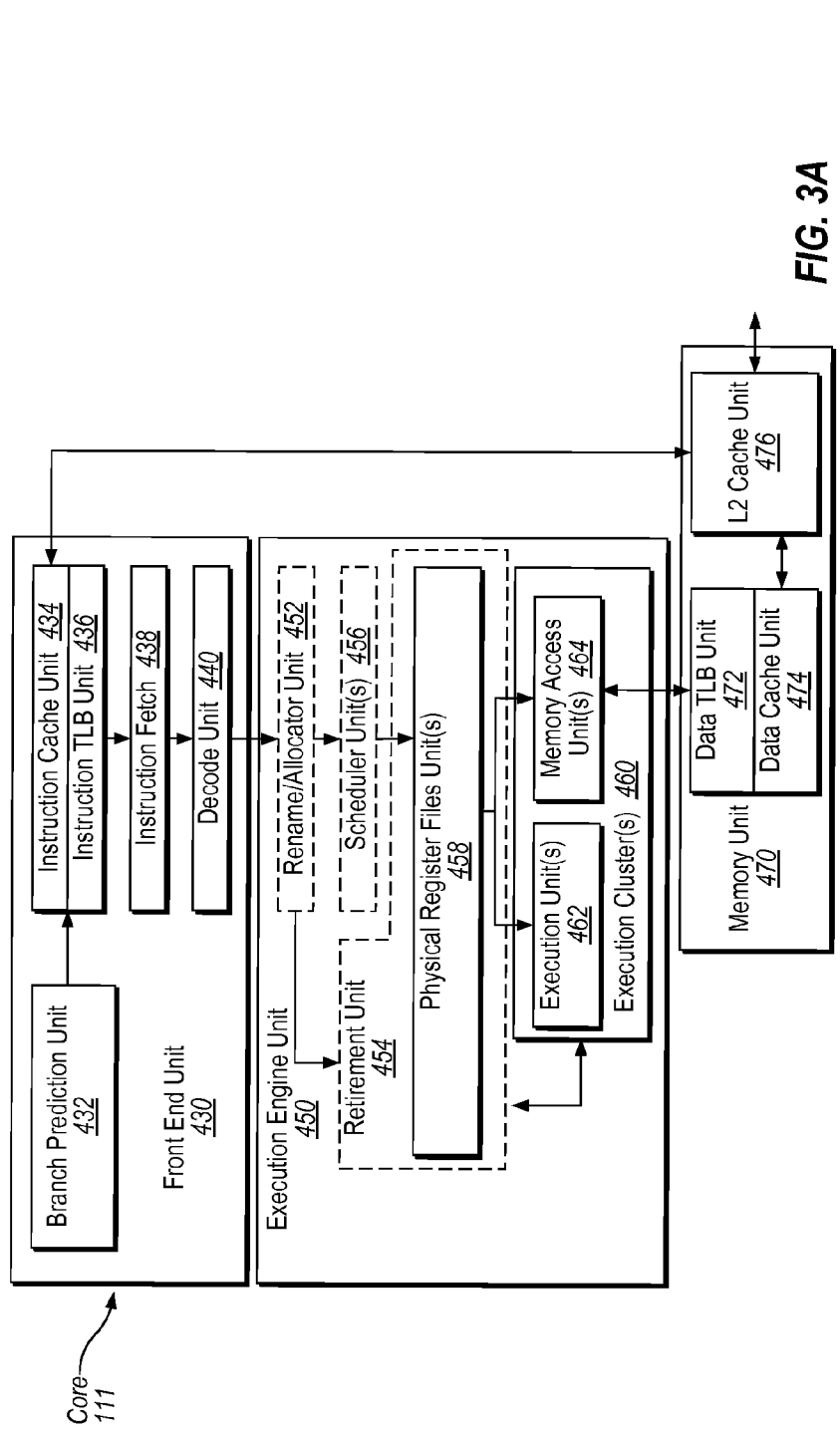
FIGS. 3a-3b schematically illustrates elements of a processor micro-architecture, in accordance with one or more aspects of the present disclosure.
Figure 3B:
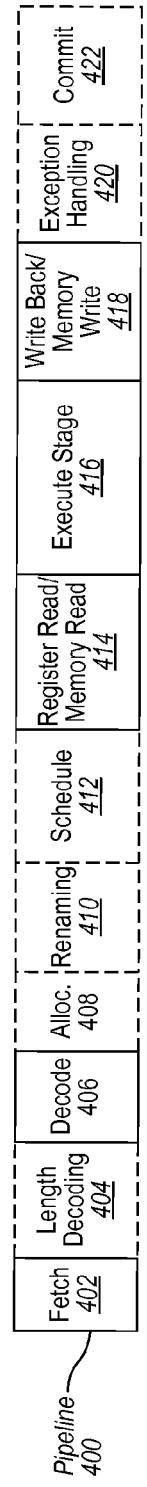

FIGS. 3a-3b schematically illustrates elements of a processor micro-architecture, in accordance with one or more aspects of the present disclosure. In FIG. 3a, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

In FIG. 3b, arrows denote a coupling between two or more units and the direction of the arrow indicates a direction of data flow between those units. FIG. 3b shows processor core 490 including a front end unit 430 coupled to an execution engine unit 450, and both are coupled to a memory unit 470.

The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 Coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register aliasing and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register aliasing, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register aliasing, out-of-order issue/execution core architecture may implement the pipeline 400 as follows: the instruction fetch 438 performs the fetch and length decoding stages 402 and 404; the decode unit 440 performs the decode stage 406; the rename/allocator unit 452 performs the allocation stage 408 and renaming stage 410; the scheduler unit(s) 456 performs the schedule stage 412; the physical register file(s) unit(s) 458 and the memory unit 470 perform the register read/memory read stage 414; the execution cluster 460 perform the execute stage 416; the memory unit 470 and the physical register file(s) unit(s) 458 perform the write back/memory write stage 418; various units may be involved in the exception handling stage 422; and the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

In certain implementations, the core may support multi-threading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register aliasing is described in the context of out-of-order execution, it should be understood that register aliasing may be used in an in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

In certain implementations, processor core 490 may be designed as an out-of-order (OOO) core in order to improve the performance by executing instructions as soon as their operands become available, rather than in the program order. However, the performance benefit may be offset by a considerable increase in the power consumption. When multiple execution threads are available for the operating system to schedule, employing multiple in-order cores rather than large OOO cores may improve the energy consumption profile of the processor without compromising the overall performance. Thus, to improve the performance and energy consumption scalability of a processor, the latter may be designed to support a variable number of cores depending on the performance needs and the number of threads available to the operating system for scheduling.

Figure 4:
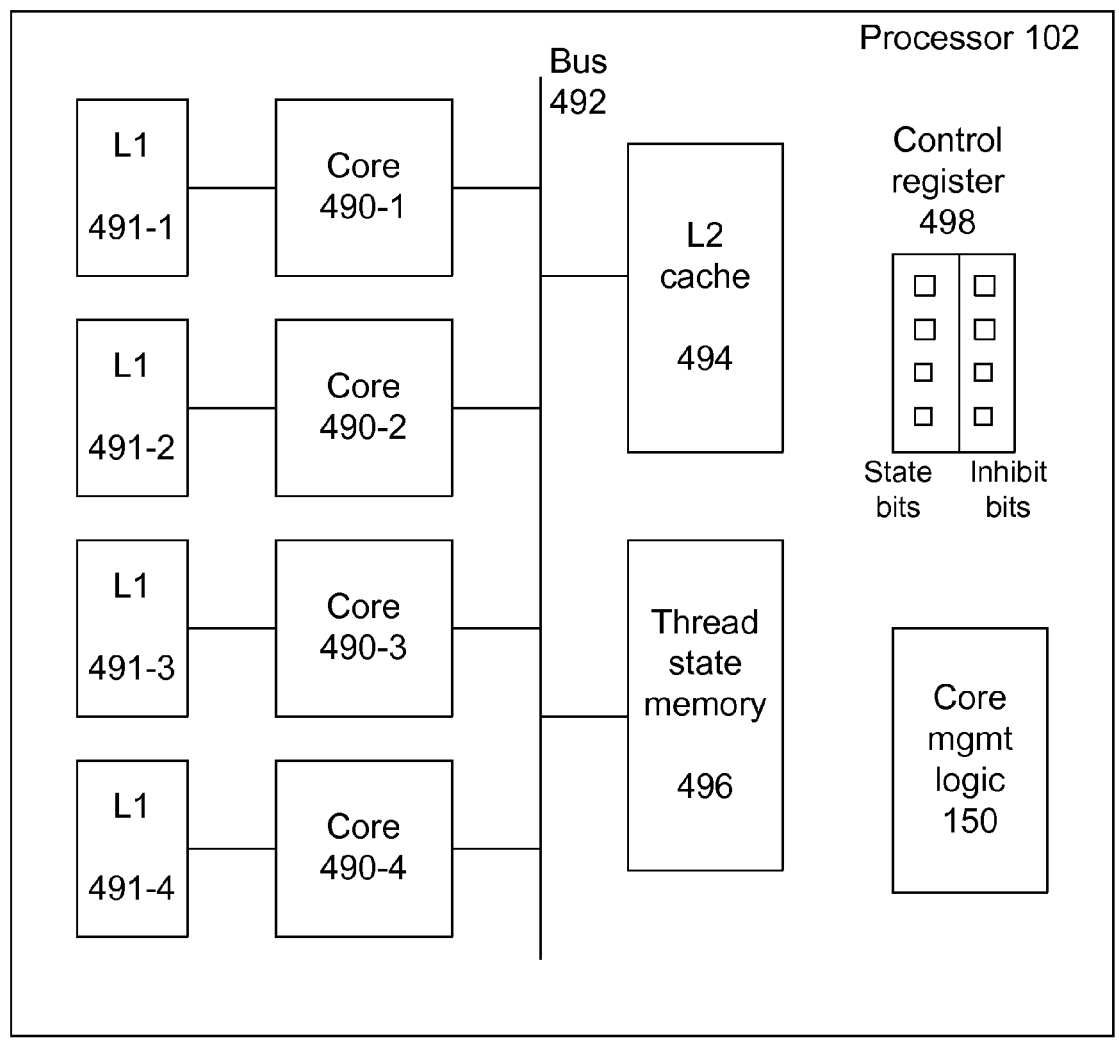
FIG. 4 schematically illustrates several aspects an example processor core, in accordance with one or more aspects of the present disclosure.

FIG. 4 illustrates a block diagram of an example processor 102, in accordance with one or more aspects of the present disclosure. Processor 102 comprising two or more processor cores 490-1, 490-2, etc., may be capable of dynamically reconfiguring itself by "fusing" two or more cores into one core having a larger fetch, issue, and commit width, a larger cache size and/or a larger branch predictor size. Example processor 102 may be configured to support various degrees of parallelism in the software being executed, ranging from supporting highly parallel software by providing multiple processing cores to supporting sequentially executable code by merging two or more processing cores into a more powerful processing core.

In the illustrative example of FIG. 4, cores 490 may be provided by identical OOO cores having private L1 caches 491-1, 491-2, etc., connected by a bus 492. Also connected to the bus 492 may be an L2 cache 494 and a core state memory 496. Although in FIG. 4 the core state memory 496 is shown as a separate component, in certain implementations, the core state memory may reside within L1 cache of each core or within the shared L2 cache.

Core state memory 496 may be employed to store the state of a core 490 transitioning into the inactive state, thus allowing to re-allocate the core's resources to another core when the processor reconfigures. The core state may be restored from the core state memory responsive to the core's re-partitioning and transitioning into the active state, as described in more details herein below.

Processor 102 may further comprise a control register 498 and a core management logic 150 designed to manage the processor cores, as described in more details herein below. Control register 498 may comprise a plurality of state bits and a plurality of inhibit bits, such that a state bit and an inhibit bit correspond to each of the cores 490-1, 490-2, etc.

The state bit reflects the current state of the corresponding core: the bit may be set indicating that the corresponding core is active (i.e., is executing a thread) or cleared indicating that the corresponding core is idle (i.e., is not executing a thread). The state bits may be modified by the processor 102 or by a program executed by the computer system 100 at a privileged execution level (e.g., by the operating system of the computer system 100). The state bits may be cleared by the core management logic 150 upon the processor power up. A state bit may be set by a program executed by the computer system 100 at a privileged execution level responsive to scheduling a thread to be executed by the core corresponding to the state bit. A state bit may be cleared by the core corresponding to the state bit or by the core management logic 150 responsive to the core's executing a pre-defined instruction (e.g., HLT, a core halting instruction). Thus, certain core instructions, such as HLT, or other traps that are meant to suspend the core activity, may force the core to transition into the inactive state, to allow the core to be merged with other cores. Responsive a core's transitioning into the inactive state, the core state may be stored in the core state memory 496, as described in more details herein below.

A state bit may also be cleared by a program executed by the computer system 100 at a privileged execution level, in order to suspend execution of a thread being currently executed by the core corresponding to the state bit. A state bit may be set by a program executed by the computer system 100 at a privileged execution level, in order to force re-partitioning of previously merged processor cores, as described in more details herein below.

The inhibit bit indicates whether the corresponding core is allowed to merge with other cores. By setting the bit, a program executed by the computer system 100 at a privileged execution level (e.g., the operating system of the computer system 100) may inhibit the corresponding core from merging with other cores; by clearing the bit, the operating system may allow the corresponding core's merging with other cores.

In one illustrative example, the processor 102 may comprise eight cores 490-1, . . . , 490-8, as schematically illustrated by FIG. 5a-5d. The control register 498 may comprise eight state bits and eight inhibit bits corresponding to the cores 490-1, . . . , 490-8. At the moment in time schematically illustrated by FIG. 5a, all cores 490-1, . . . , 490-8 may be actively running threads, which may be reflected by the corresponding status bits being set. All the inhibit bits, except the core 490-8 inhibit bit, may be cleared to indicate that the corresponding cores 490-1, . . . , 490-7 are allowed to merge with other cores.

Figure 5A:
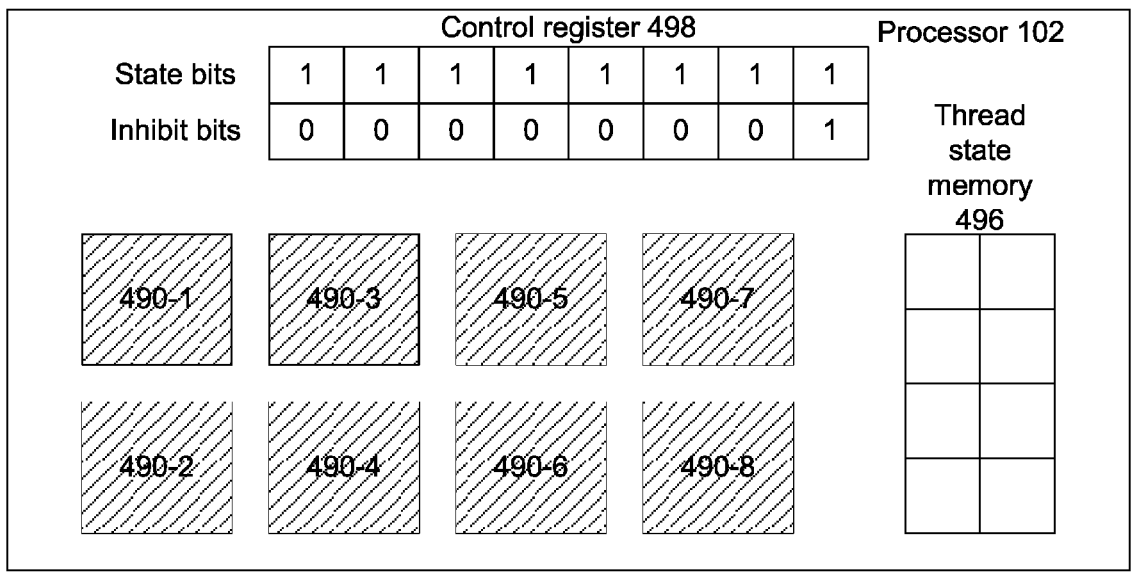
FIGS. 5a-5d schematically illustrate examples of re-configuring processor cores, in accordance with one or more aspects of the present disclosure.
Figure 5B:
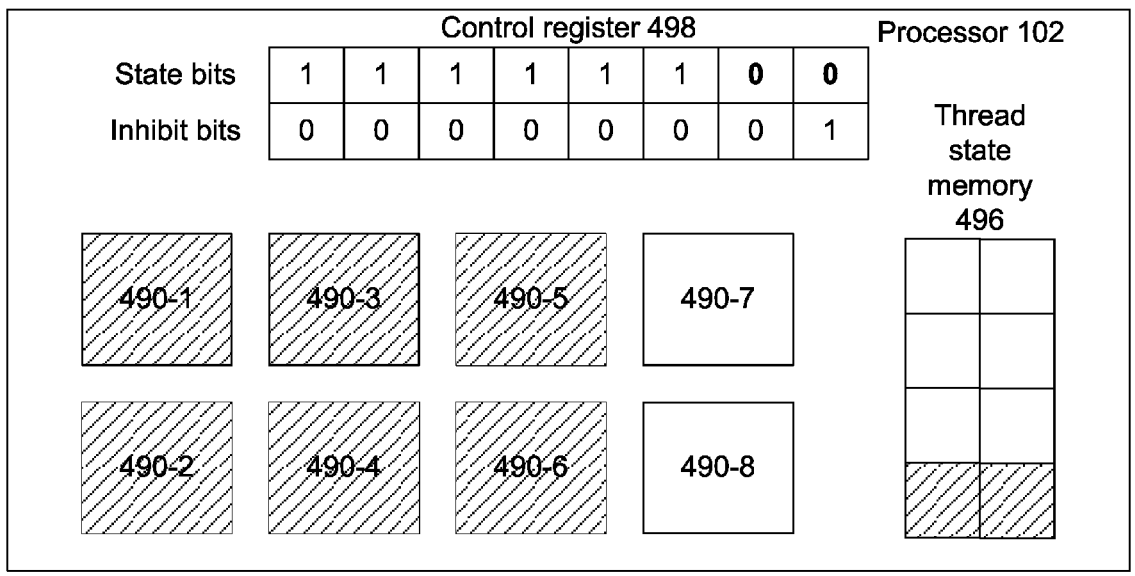

At a subsequent moment in time, a program executed by the computer system 100 at a privileged execution level (e.g., the operating system of the computer system 100) may make cores 490-7 and 490-8 inactive by clearing the corresponding status bits of the control register 498, as schematically illustrated by FIG. 5b. Responsive to the cores 490-7 and 490-8 transitioning into the inactive state, the core states may be stored in the core state memory 496. The inhibit bits are not affected by the cores 490-7 and 490-8 transitioning into the inactive state.

Figure 5C:
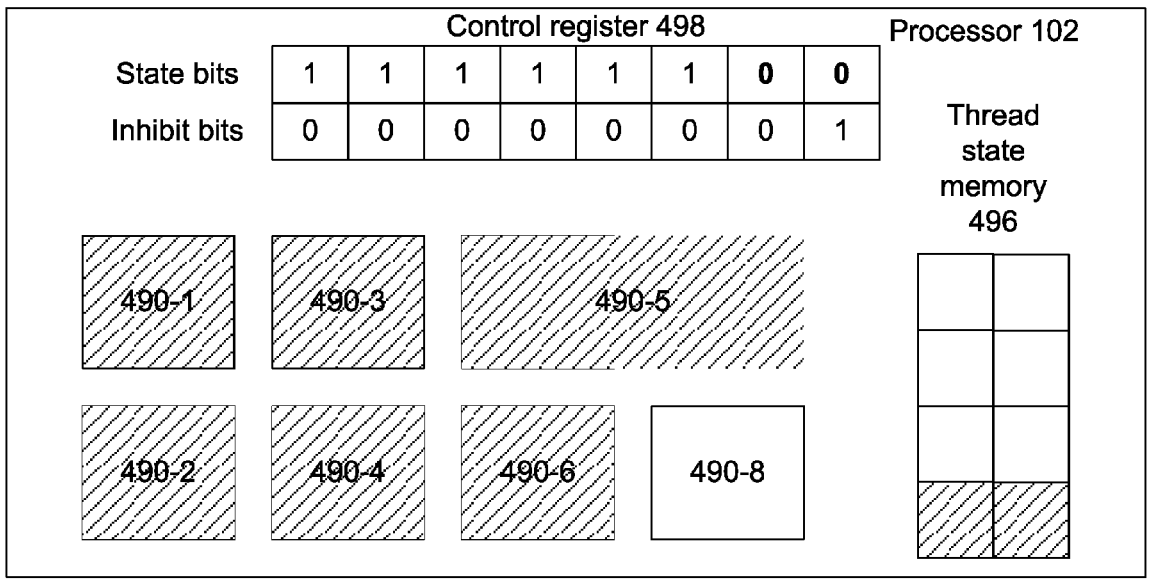

As noted herein above, an inactive core may be merged with an active core unless the inactive core's merging is disallowed by the corresponding inhibit bit. In the example of FIG. 5b, core 490-8, although inactive, cannot be merged with other cores since the corresponding inhibit bit is set. The inhibit bit corresponding to core 490-7 is cleared, hence, core 490-7 may be merged with other cores. FIG. 5c illustrates the configuration of processor 102 after core 490-7 has been merged with core 490-5. The control register bits are not affected by the processor reconfiguration.

Figure 5D:
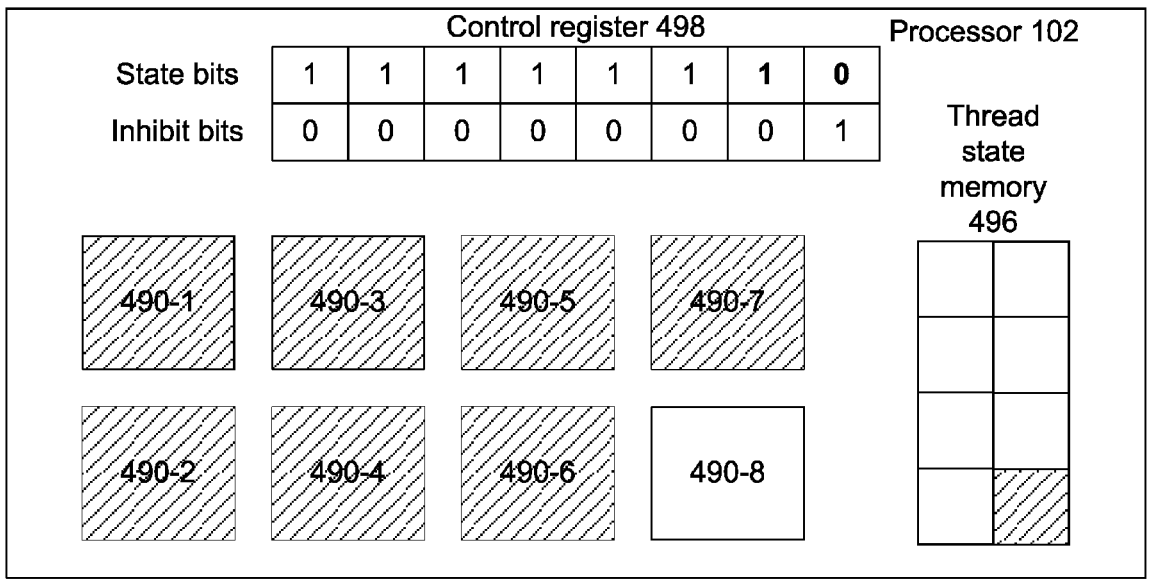

At a subsequent moment in time, a program executed by the computer system 100 at a privileged execution level (e.g., the operating system of the computer system 100) may force re-partitioning of core 490-7 by setting the state bit of the control register 498, as schematically illustrated by FIG. 5d. Responsive to the core 490-7 transitioning into the active state, cores 490-5 and 490-7 may re-partition, and the state of core 490-7 may be restored from the core state memory 496.

Figure 6:
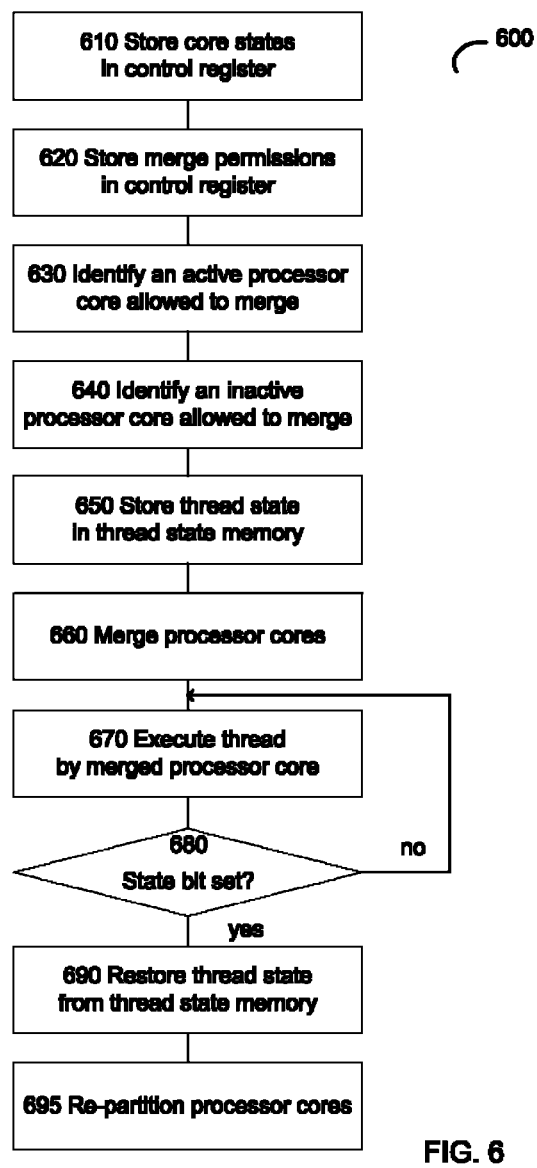
FIG. 6 depicts a flow diagram of an example method for managing reconfigurable processor cores, in accordance with one or more aspects of the present disclosure.

FIG. 6 depicts a flow diagram of an example method for managing reconfigurable processor cores, in accordance with one or more aspects of the present disclosure. The method 600 may be performed by a computer system that may comprise hardware (e.g., circuitry, dedicated logic, and/or programmable logic), software (e.g., instructions executable on a computer system to perform hardware simulation), or a combination thereof. The method 600 and/or each of its functions, routines, subroutines, or operations may be performed by one or more physical processors of the computer system executing the method. Two or more functions, routines, subroutines, or operations of method 600 may be performed in parallel or in an order which may differ from the order described above. In one example, as illustrated by FIG. 6, the method 600 may be performed by the computer system 100 of FIG. 1.

Referring to FIG. 6, at block 610, a processing system may store the states of a plurality of processor cores of the processing system in a plurality of state bits of a control register. A set bit may indicate the active state, while a cleared bit may indicate the inactive state of the corresponding processor core.

At block 620, the processing system may store merge permissions for the plurality of processor cores in a plurality of inhibit bits of the control register. Each inhibit bit may indicate whether the corresponding processor core is allowed to merge with other processor cores.

At block 630, the processing system may identify a first processor core, having the corresponding state bit set and the corresponding inhibit bit cleared.

At block 640, the processing system may identify a second processor core, having the corresponding state bit cleared and the corresponding inhibit bit cleared.

At block 650, the processing system may store the state of the second processing core in the core state memory.

At block 660, the processing system may merge the first processor core with the second processor core.

At block 670, the processing system may execute a thread by the merged processor core.

Responsive to determining, at block 680, that the second processor core's state bit has been set by a program executed by the computer system 100 at a privileged execution level (e.g., by the operating system of the computer system 100), the processing system may, at block 690, restore the state of the second processing core from the core state memory.

At block 695, the processing system may re-partition the first processor core and the second processor core. Upon completing the operations referenced by block 695, the method may terminate.

The methods and systems described herein above may be implemented by computer system of various architectures, designs and configurations for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable to implement the methods described herein. In general, a large variety of systems or electronic devices capable of incorporating a processor and/or other execution logic as disclosed herein are generally suitable for implementing the systems and methods described herein.

Figure 7:
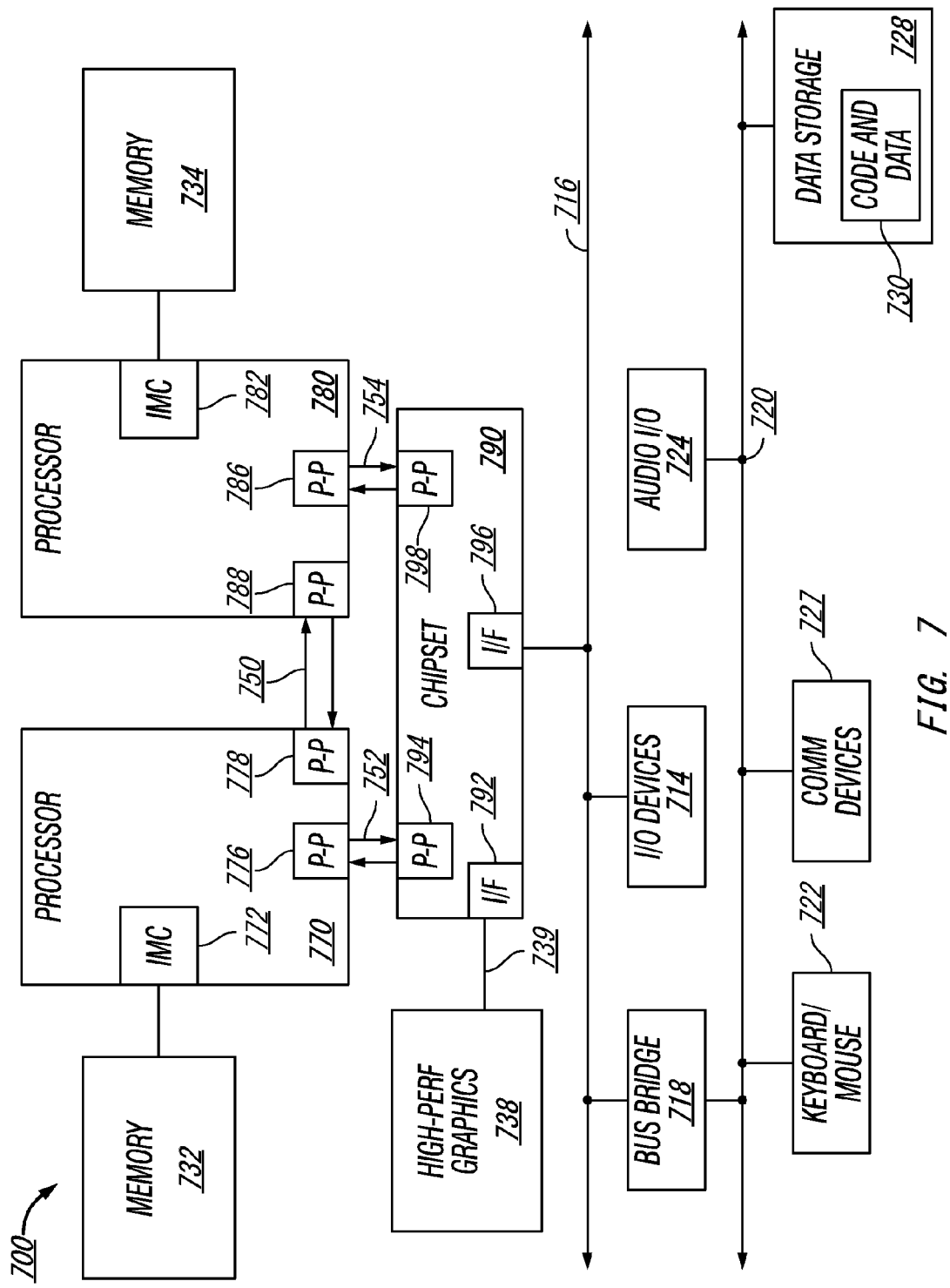
FIG. 7 depicts a block diagram of an example computer system, in accordance with one or more aspects of the present disclosure.

FIG. 7 depicts a block diagram of an example computer system, in accordance with one or more aspects of the present disclosure. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 102 capable of performing return address verification, as described in more details herein above. While shown with only two processors 770, 780, it is to be understood that the scope of the present disclosure is not so limited. In other embodiments, one or more additional processors may be present in the example computer system.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720.

Figure 8:
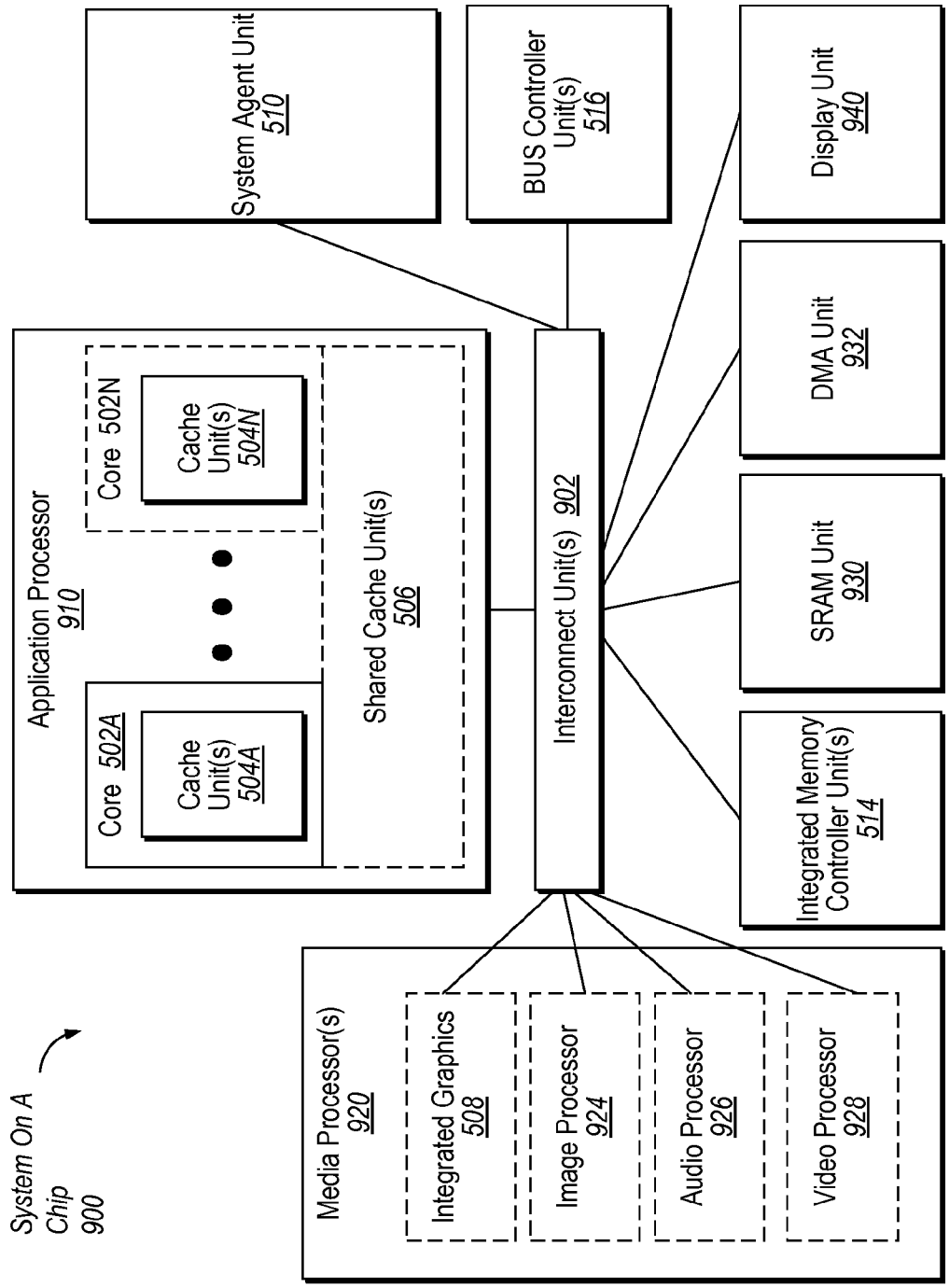
FIG. 8 depicts a block diagram of an example system on a chip (SoC), in accordance with one or more aspects of the present disclosure.

FIG. 8 depicts a block diagram of an example system on a chip (SoC), in accordance with one or more aspects of the present disclosure. The application processor 910 may be capable of performing return address verification, as described in more details herein above. As schematically illustrated by FIG. 8, interconnect unit(s) 902 may be coupled to: an application processor 910 which includes a set of one or more cores 902A-N and shared cache unit(s) 906; a system agent unit 910; a bus controller unit(s) 916; an integrated memory controller unit(s) 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 9:
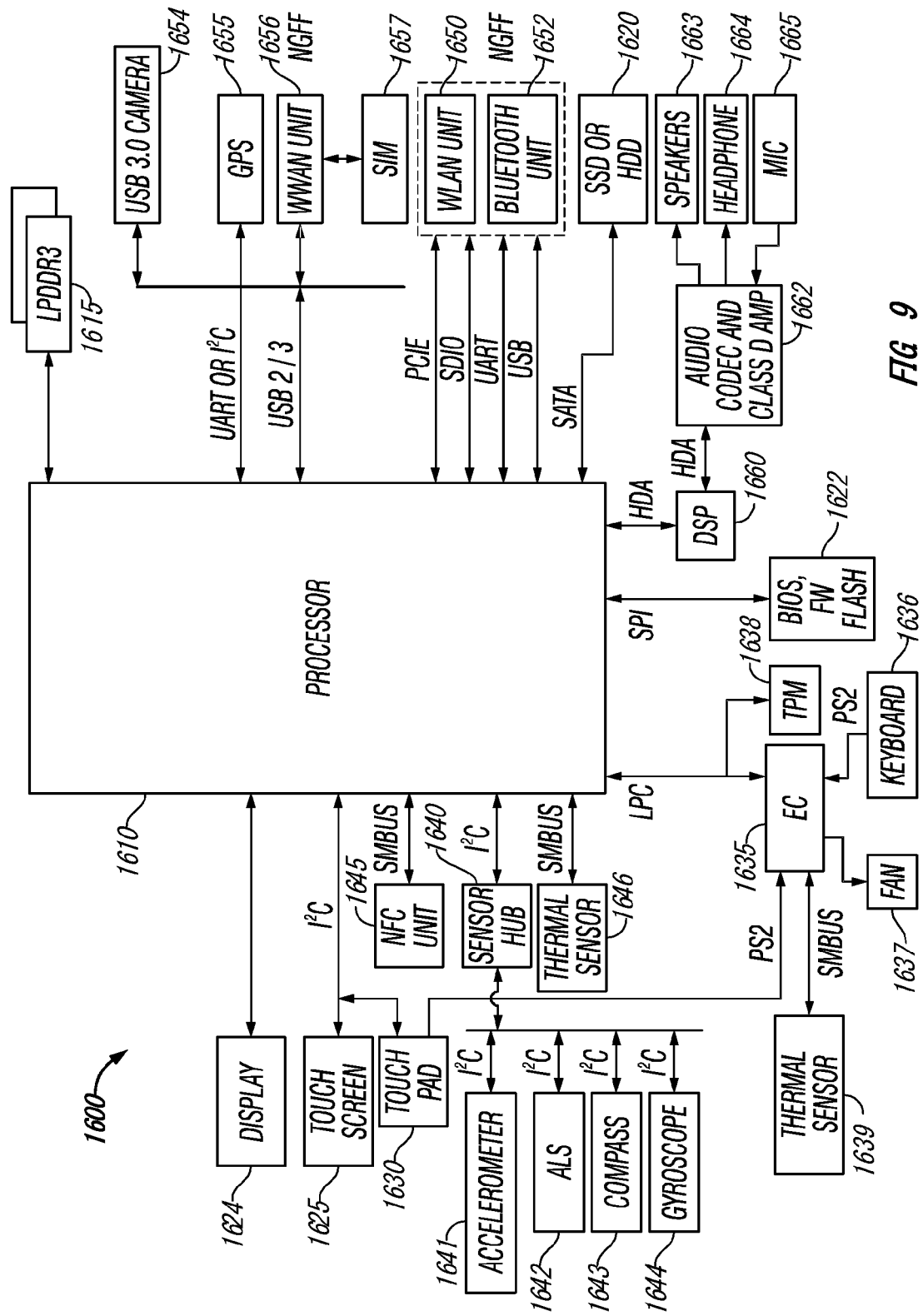
FIG. 9 depicts a block diagram of an example computer system, in accordance with one or more aspects of the present disclosure.

FIG. 9 depicts a block diagram of an example computer system, in accordance with one or more aspects of the present disclosure. Processor 1610 may be provided by some version of the processor 102 capable of performing return address verification, as described in more details herein above.

The system 1600 schematically illustrated by FIG. 9 may include any combination of components implemented as ICs, portions thereof, discrete electronic devices, or other modules, logic, hardware, software, firmware, or a combination thereof adapted in a computer system, or as components otherwise incorporated within a chassis of the computer system. The block diagram of FIG. 9 is intended to show a high level view of many components of the computer system. However, it is to be understood that some of the components shown may be omitted, additional components may be present, and different arrangement of the components shown may occur in other implementations.

Processor 1610 may be provided by a microprocessor, multi-core processor, multithreaded processor, an ultra low voltage processor, an embedded processor, or other known processing element. In the illustrated implementation, processor 1610 acts as a main processing unit and central hub for communication with many of the various components of the system 1600. As one example, processor 1600 may be implemented as a system on a chip (SoC). As a specific illustrative example, processor 1610 includes an Intel® Architecture Core™-based processor such as an i3, i5, i7 or another such processor available from Intel Corporation, Santa Clara, Calif.

Processor 1610 may communicate with a system memory 1615. In various implementations the individual memory devices may be of different package types such as single die package (SDP), dual die package (DDP) or quad die package (1P). These devices, in some implementations, may be directly soldered onto a motherboard to provide a lower profile solution, while in other implementations the devices may be configured as one or more memory modules that in turn couple to the motherboard by a given connector. Other memory implementations are possible, such as other types of memory modules, e.g., dual inline memory modules (DIMMs) of different varieties including but not limited to microDIMMs, MiniDIMMs. In one illustrative example, the memory may be sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1620 may be also coupled to processor 1610. In certain implementations, to enable a thinner and lighter system design as well as to improve system responsiveness, the mass storage 1620 may be implemented via a Solid State Drive (SSD). In other implementations, the mass storage may primarily be provided by a hard disk drive (HDD) with a smaller amount of SSD storage to act as a SSD cache to enable non-volatile storage of context state and other such information during power down events so that a fast power up can occur on re-initiation of system activities.

Also shown in FIG. 9, a flash device 1622 may be coupled to processor 1610, e.g., via a serial peripheral interface (SPI). The flash device 1622 may provide for non-volatile storage of system software, including a basic input/output software (BIOS) as well as other firmware of the system.

In various implementations, the mass storage of the system may be provided by a SSD alone or as a disk, optical or other drive with an SSD cache. In some implementations, the mass storage may be provided by an SSD or as a HDD along with a restore (RST) cache module. The SSD cache may be configured as a single level cache (SLC) or multi-level cache (MLC) option to provide an appropriate level of responsiveness.

Various input/output (IO) devices may be present within system 1600, including, e.g., a display 1624 which may be provided by a high definition LCD or LED panel configured within a lid portion of the chassis. This display panel may also provide for a touch screen 1625 adapted externally over the display panel such that via a user's interaction with this touch screen, user inputs can be provided to the system to enable desired operations, e.g., with regard to the display of information, accessing of information and so forth. In certain implementations, display 1624 may be coupled to processor 1610 via a display interconnect that can be implemented as a high performance graphics interconnect. Touch screen 1625 may be coupled to processor 1610 via another interconnect, which in an embodiment can be an Inter-Integrated Circuit (I2C )interconnect. In addition to touch screen 1625, user input by way of touch can also occur via a touch pad 1630 which may be configured within the chassis and may also be coupled to the same I2C interconnect as touch screen 1625.

Various sensors may be present within the system and may be coupled to processor 1610 in different manners. Certain inertial and environmental sensors may couple to processor 1610 through a sensor hub 1640, e.g., via an I2C interconnect. These sensors may include an accelerometer 1641, an ambient light sensor (ALS) 1642, a compass 1643 and a gyroscope 1644. Other environmental sensors may include one or more thermal sensors 1646 which in some embodiments couple to processor 1610 via a system management bus (SMBus) bus. In certain implementations, one or more infrared or other heat sensing elements, or any other element for sensing the presence or movement of a user may be present.

Various peripheral devices may couple to processor 1610 via a low pin count (LPC) interconnect. In certain implementations, various components can be coupled through an embedded controller 1635. Such components can include a keyboard 1636 (e.g., coupled via a PS2 interface), a fan 1637, and a thermal sensor 1639. In some embodiments, touch pad 1630 may also couple to EC 1635 via a PS2 interface. In addition, a security processor such as a trusted platform module (TPM) 1638 in accordance with the Trusted Computing Group (TCG) TPM Specification Version 1.2, dated Oct. 2, 2003, may also couple to processor 1610 via this LPC interconnect.

In certain implementations, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1600 can communicate with external devices in a variety of manners, including wirelessly. In the embodiment shown in FIG. 16, various wireless modules, each of which can correspond to a radio configured for a particular wireless communication protocol, are present. One manner for wireless communication in a short range such as a near field may be via a near field communication (NFC) unit 1645 which may communicate, in one embodiment with processor 1610 via an SMBus.

Additional wireless units can include other short range wireless engines including a WLAN unit 1650 and a Bluetooth® unit 1652. Using WLAN unit 1650, Wi-Fi™ communications in accordance with a given Institute of Electrical and Electronics Engineers (IEEE) 802.11 standard can be realized, while via Bluetooth® unit 1652, short range communications via a Bluetooth® protocol can occur. These units may communicate with processor 1610 via, e.g., a USB link or a universal asynchronous receiver transmitter (UART) link. Or these units may couple to processor 1610 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the Next Generation Form Factor (NGFF) connectors adapted to a motherboard.

In addition, wireless wide area communications, e.g., according to a cellular or other wireless wide area protocol, can occur via a WWAN unit 1656 which in turn may couple to a subscriber identity module (SIM) 1657. In addition, to enable receipt and use of location information, a GPS module 1655 may also be present.

To provide for audio inputs and outputs, an audio processor can be implemented via a digital signal processor (DSP) 1660, which may couple to processor 1610 via a high definition audio (HDA) link. Similarly, DSP 1660 may communicate with an integrated coder/decoder (CODEC) and amplifier 1662 that in turn may couple to output speakers 1663 which may be implemented within the chassis. Similarly, amplifier and CODEC 1662 can be coupled to receive audio inputs from a microphone 1665.

Figure 10:
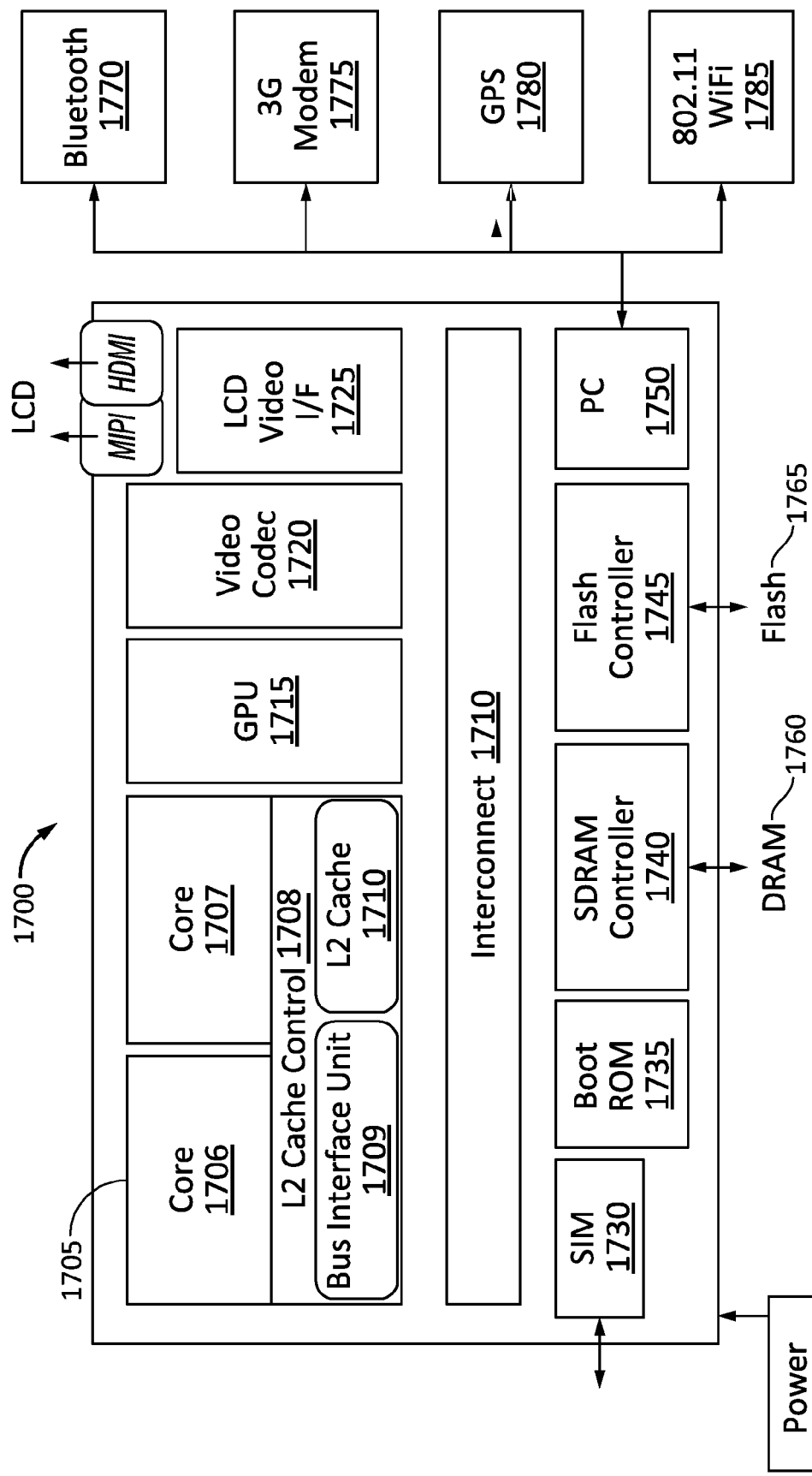
FIG. 10 depicts a block diagram of an example system on a chip (SoC), in accordance with one or more aspects of the present disclosure.

FIG. 10 depicts a block diagram of an example system on a chip (SoC), in accordance with one or more aspects of the present disclosure. As a specific illustrative example, SOC 1700 may be included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

As schematically illustrated by FIG. 10, SOC 1700 may include two cores. Cores 1706 and 1707 may be coupled to cache control 1708 that is associated with bus interface unit 1709 and L2 cache 1710 to communicate with other parts of system 1700. Interconnect 1710 may include an on-chip interconnect, such as an Intel® On-Chip System Fabric (IOSF), Advanced Microcontroller Bus Architecrure (AMBA), or other interconnect.

Interface 1710 may provide communication channels to the other components, such as a Subscriber Identity Module (SIM) 1730 to interface with a SIM card, a boot ROM 1735 to hold boot code for execution by cores 1706 and 1707 to initialize and boot SOC 1700, a SDRAM controller 1740 to interface with external memory (e.g., DRAM 1760), a flash controller 1745 to interface with non-volatile memory (e.g., flash 1765), a peripheral control 1750 (e.g., Serial Peripheral Interface) to interface with peripherals, video codecs 1720 and Video interface 1725 to display and receive input (e.g., touch enabled input), GPU 1715 to perform graphics related computations, etc. In addition, the system may comprise peripherals for communication, such as a Bluetooth® module 1770, 3G modem 1775, GPS 1785, and WiFi 1785.

Other computer system designs and configurations may also be suitable to implement the systems and methods described herein. The following examples illustrate various implementations in accordance with one or more aspect of the present disclosure.

The following examples illustrate various implementations in accordance with one or more aspect of the present disclosure.

Example 1 is a processing system, comprising: a plurality of processor cores, each processor core being in one of: an active state or an inactive state; a control register including a plurality of state bits, each state bit indicating a state of a corresponding processor core, the control register further including a plurality of inhibit bits, each inhibit bit indicating whether a corresponding processor core is allowed to merge with other processor cores; and a core management logic configured to merge a first processor core and a second processor core, responsive to determining that a first state bit corresponding to the first processor core is set, a first inhibit bit corresponding to the first processor core is cleared, a second state bit corresponding to the second processor core is cleared, and a second inhibit bit corresponding to the second processor core is cleared.

In Example 2, the core management logic of the processing system of Example 1 may be further configured, responsive to determining that the second state bit is set, to re-partition the first processor core and the second processor core.

In Example 3, the processing system of Example 1 may further comprise a core state memory; and the core management logic may be further configured to store a state of the second processor core in the core state memory prior to merging the first processor core with the second processor core.

In Example 4, the core management logic of the processing system of Example 1 may be further configured, responsive to determining that the second state bit is set, to restore the state of the second processor core from the core state memory and re-partition the first processor core and the second processor core.

Example 5 is a processing system, comprising: a plurality of processor cores, each processor core being in one of: an active state or an inactive state; a control register including a plurality of state bits, each state bit indicating a state of a corresponding processor core, the control register further including a plurality of inhibit bits, each inhibit bit indicating whether a corresponding processor core is allowed to merge with other processor cores; and a processing means configured to merge a first processor core and a second processor core, responsive to determining that a first state bit corresponding to the first processor core is set, a first inhibit bit corresponding to the first processor core is cleared, a second state bit corresponding to the second processor core is cleared, and a second inhibit bit corresponding to the second processor core is cleared.

In Example 6, the processing means of the processing system of Example 5 may be further configured, responsive to determining that the second state bit is set, to re-partition the first processor core and the second processor core.

In Example 7, the processing system of Example 5 may further comprise a core state memory; and the processing means may be further configured to store a state of the second processor core in the core state memory prior to merging the first processor core with the second processor core.

In Example 8, the processing means of the processing system of Example 5 may be further configured, responsive to determining that the second state bit is set, to restore the state of the second processor core from the core state memory and re-partition the first processor core and the second processor core.

In Example 9, the core state memory of the processing system of any of the Examples 3, 4, 7, or 8 may reside in an L1 cache or an L2 cache.

In Example 10, the control register of the processing system of any of the Examples 1-8 may be writable by a thread executing by the processing system at a privileged level of execution.

In Example 11, at least one processor core of the processing system of any of the Examples 1-8 may be provided by an out-of-order core.

In Example 12, at least one processor core of the processing system of any of the Examples 1-8 may be provided by an in-order core.

Example 13 is a method for managing reconfigurable processor cores, comprising: storing, by a processing system comprising a plurality of processor cores, states of the plurality of processor cores of the processing system in a plurality of state bits of a control register; storing merge permissions for the plurality of processor cores of the processing system in a plurality of inhibit bits of a control register, each inhibit bit indicating whether a corresponding processor core is allowed to merge with other processor cores; determining that a first state bit corresponding to a first processor core is set, a first inhibit bit corresponding to the first processor core is cleared, a second state bit corresponding to a second processor core is cleared, and a second inhibit bit corresponding to the second processor core is cleared; and merging the first processor core with the second processor core.

In Example 14, the method of Example 13 may further comprise: determining that the second state bit is set; and re-partitioning the first processor core and the second processor core.

In Example 15, the method of Example 13 may further comprise: storing a state of the second processor core in the core state memory prior to merging the first processor core with the second processor core.

In Example 16, the method of Example 15 may further comprise: determining that the second state bit is set; restoring the state of the second processor core from the core state memory; and re-partitioning the first processor core and the second processor core.

In Example 17, at least one processor core of the method of Example 13 may be provided by an out-of-order core.

In Example 18, at least one processor core of the method of Example 13 may be provided by an in-order core.

Example 19 is an apparatus comprising a memory and a processing system coupled to the memory, wherein the processing system is configured to perform the method of any of the Examples 13-18.

Example 20 is a computer-readable non-transitory storage medium comprising executable instructions that, when executed by a processing system comprising a plurality of processor cores, cause the computing system to perform operations, comprising: storing states of the plurality of processor cores of the processing system in a plurality of state bits of a control register; storing merge permissions for the plurality of processor cores of the processing system in a plurality of inhibit bits of a control register, each inhibit bit indicating whether a corresponding processor core is allowed to merge with other processor cores; determining that a first state bit corresponding to a first processor core is set, a first inhibit bit corresponding to the first processor core is cleared, a second state bit corresponding to a second processor core is cleared, and a second inhibit bit corresponding to the second processor core is cleared; and merging the first processor core with the second processor core.

In Example 21, the computer-readable non-transitory storage medium of Example 20 may further comprising executable instructions causing the computing system to: determine that the second state bit is set; and re-partition the first processor core and the second processor core.

In Example 22, the computer-readable non-transitory storage medium of Example 20 may further comprising executable instructions causing the computing system to: store a state of the second processor core in the core state memory prior to merging the first processor core with the second processor core.

In Example 23, the computer-readable non-transitory storage medium of Example 22 may further comprising executable instructions causing the computing system to: determine that the second state bit is set; restore the state of the second processor core from the core state memory; and re-partition the first processor core and the second processor core.

In Example 24, at least one processor core of Example 20 may be provided by an out-of-order core.

In Example 25, at least one processor core of Example 20 may be provided by an in-order core.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments described herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

The invention claimed is:

1. A processing system, comprising:
 a plurality of processor cores comprising a first processor core and a second processor core, each processor core of the plurality of processor cores being in one of: an active state or an idle state, wherein the first processor core comprises a first branch predictor having a first branch predictor size and the second processor core comprises a second branch predictor having a second branch predictor size;
 a control register comprising a plurality of state bits including a first state bit indicating one of: the active state or the idle state of the first processor core, and a second state bit indicating one of: the active state or the idle state of the second processor core, the control register further comprising a plurality of inhibit bits including a first inhibit bit indicating whether the first processor core is allowed to merge with other processor cores, and a second inhibit bit indicating whether the second processor core is allowed to merge with other processor cores; and
 a core management logic to produce a third processor core by merging the first processor core and the second processor core, responsive to determining that the first state bit indicates the active state of the first processor core, the first inhibit bit indicates that the first processor core is allowed to merge with other processor cores, the second state bit indicates the idle state of the second processor core, and the second inhibit bit indicates that the second processor core is allowed to merge with other processor cores;
 wherein the third processor core comprises a third branch predictor having a third branch predictor size, the third branch predictor size exceeding a maximum of the first branch predictor size and the second branch predictor size; and
 wherein the core management logic is further, responsive to determining that the second state bit indicates the active state of the second processor core, to restore the state of the second processor core from the core state memory and re-partition the third processor core back to the first processor core and the second processor core.

2. The processing system of claim 1, further comprising a core state memory;
 wherein the core management logic is further to store a state of the second processor core in the core state memory prior to merging the first processor core with the second processor core.

3. The processing system of claim 2, wherein the core state memory resides in one of: an L1 cache or an L2 cache.

4. The processing system of claim 1, wherein the control register is writable by a thread executing by the processing system at a privileged level of execution.

5. The processing system of claim 1, wherein at least one processor core is provided by an out-of-order core.

6. The processing system of claim 1, wherein at least one processor core is provided by an in-order core.

7. The processing system of claim 1, wherein the core management logic is further, responsive to determining that the second state bit indicates the active state of the second processor core, to re-partition the first processor core and the second processor core.

8. A method, comprising:
 storing in a control register, by a processing system comprising a plurality of processor cores, a first state bit indicating one of: an active state or an idle state of the first processor core, and a second state bit indicating one of: an active state or an idle state of the second processor core;
 storing, in the control register, a first inhibit bit indicating whether the first processor core is allowed to merge with other processor cores, and a second inhibit bit indicating whether the second processor core is allowed to merge with other processor cores;
 determining, by a core management logic, that the first state bit indicates the active state of the first processor core, the first inhibit bit indicates that the first processor core is allowed to merge with other processor cores, the second state bit indicates the idle state of the second processor core, and the second inhibit bit indicates that the second processor core is allowed to merge with other processor cores;

producing, by the core management logic, a third processor core by merging the first processor core with the second processor core;

wherein the first processor core comprises a first branch predictor having a first branch predictor size, and the second processor core comprises a second branch predictor having a second branch predictor size; and wherein the third processor core comprises a third branch predictor having a third branch predictor size, the third branch predictor size exceeding a maximum of the first branch predictor size and the second branch predictor size; and wherein the core management logic is further, responsive to determining that the second state bit indicates the active state of the second processor core, to restore the state of the second processor core from the core state memory and re-partition the third processor core back to the first processor core and the second processor core.

9. The method of claim 8, further comprising:
storing a state of the second processor core in the core state memory prior to merging the first processor core with the second processor core.

10. The method of claim 9, further comprising:
restoring the state of the second processor core from the core state memory.

11. The method of claim 8, wherein at least one processor core is provided by an out-of-order core.

12. The method of claim 8, wherein at least one processor core is provided by an in-order core.

13. The method of claim 8, further comprising:
determining that the second state bit indicates the active state of the second processor core; and
re-partitioning the first processor core and the second processor core.

14. A computer-readable non-transitory storage medium comprising executable instructions that, when executed by a processing system comprising a plurality of processor cores, cause the computing system to perform operations, comprising:
storing, in a control register, a first state bit indicating one of: an active state or an idle state of the first processor core, and a second state bit indicating one of: an active state or an idle state of the second processor core;
storing, in the control register, a first inhibit bit indicating whether the first processor core is allowed to merge with other processor cores, and a second inhibit bit indicating whether the second processor core is allowed to merge with other processor cores;
determining, by a core management logic, that the first state bit indicates the active state of the first processor core, the first inhibit indicates that the first processor core is allowed to merge with other processor cores, the second state bit indicates the idle state of the second processor core, and the second inhibit bit indicates that the second processor core is allowed to merge with other processor cores;

producing, by the core management logic, a third processor core by merging the first processor core with the second processor core;

wherein the first processor core comprises a first branch predictor having a first branch predictor size, and the second processor core comprises a second branch predictor having a second branch predictor size; and wherein the third processor core comprises a third branch predictor having a third branch predictor size, the third branch predictor size exceeding a maximum of the first branch predictor size and the second branch predictor size; and wherein the core management logic is further, responsive to determining that the second state bit indicates the active state of the second processor core, to restore the state of the second processor core from the core state memory and re-partition the third processor core back to the first processor core and the second processor core.

15. The computer-readable non-transitory storage medium of claim 14, further comprising executable instructions causing the computing system to:
store a state of the second processor core in the core state memory prior to merging the first processor core with the second processor core.

16. The computer-readable non-transitory storage medium of claim 15, further comprising executable instructions causing the computing system to:
determine that the second state bit is indicates the active state of the second processor core;
restore the state of the second processor core from the core state memory; and
re-partition the first processor core and the second processor core.

17. The computer-readable non-transitory storage medium of claim 14, wherein at least one processor core is provided by an out-of-order core.

18. The computer-readable non-transitory storage medium of claim 14, wherein at least one processor core is provided by an in-order core.

19. The computer-readable non-transitory storage medium of claim 14, further comprising executable instructions causing the computing system to:
determine that the second state bit indicates the active state of the second processor core; and
re-partition the first processor core and the second processor core.

* * * * *